Aug. 7, 1962   R. F. ABRAHAMSEN   3,048,153
VAPOR GENERATOR
Filed July 11, 1956

INVENTOR
Roy F. Abrahamsen
BY
Eldon H. Luther
ATTORNEY 3,048,153
VAPOR GENERATOR
Roy F. Abrahamsen, Chattanooga, Tenn., assignor to Combustion Engineering, Inc., New York, N.Y., a corporation of Delaware
Filed July 11, 1956, Ser. No. 597,121
4 Claims. (Cl. 122—4)

This invention relates to vapor generators and other fluid heaters and has particular relation to such organizations employing a fluidized bed of discrete material within which fuel is introduced and oxidized therewithin and from which heat is transferred through indirect heat exchange to a fluid to be heated or vaporized.

A bed of discrete material may be fluidized by passing a stream of gas upwardly therethrough, with fluidization for a particular particle size occurring at or above a predetermined velocity. When in this fluidized state the particles of the material move rather rapidly throughout the body of the material with the entire mass being in an agitated state resembling a boiling liquid and with the violence of the agitation depending upon the velocity of the gas passing upwardly through the material. When in this fluidized state the material is not carried along with the fluidizing gas and although the body of material will be expanded from its packed or non-fluidized condition, the fluidizing gas passes through the material and leaves the same at what is termed a "disengaging zone." With a given particle size the velocity of the gases passing through the material must be maintained within specific minimum and maximum limits in order to have proper fluidization. The maximum limit is that where substantial quantities of the material are carried away by the upflowing gas stream or, in other words, the material becomes entrained within the gas stream, while the minimum limit is that below which fluidization does not occur with the mass of material remaining in the so-called packed condition with the patricles not moving from their "at rest" position.

These fluidized beds of material have the inherent properties of providing excellent contact between the upwardly flowing fluidizing gas stream and the particles in the bed and of providing extremely high rates of heat transfer from this gas stream to a heat exchange coil, or the like, immersed within the bed. These properties make it highly advantageous to be able to introduce and burn a fuel directly within such a bed and to absorb heat from the bed for the generation and/or heating of steam or the heating of other fluids.

In order to oxidize a fuel-air mixture within a bed of material it is necessary that the bed be heated to a predetermined high temperature for this oxidation reaction to take place. It has been found that the materials which are most suitable from an economic and operational standpoint need to be heated to a rather high temperature before the oxidation reaction will take place. Because of this rather high temperature it is somewhat difficult to adequately heat this material in a feasible and satisfactory manner. It has been found that the employment of an active oxidation catalyst immediately upstream of the bed of material with relation to the direction of flow of the fluidizing gas provides a rather simple and economic way of heating the bed of material since the oxidation catalyst will effect oxidation of a fuel-air mixture at a much lower temperature than the bed of material which may be inert material or a much less active oxidation catalyst and the heat liberated through this catalytic oxidation may be employed to raise the temperature of the bed of material to its required minimum value.

The oxidation catalysts to which reference is being made, have definite upper and lower temperature limits inbetween which the catalyst will properly perform its intended function of catalyzing the oxidation processes of the fuel with the upper limit being termed the "deactivation" temperature above which the catalyst is inoperative and is permanently destroyed or permanently impaired and the lower limit being termed the "activation" temperature below which the catalyst will not function as a catalyst to catalyze the oxidation process. The catalysts that are herein contemplated function to catalytically oxidize the fuel without the development of a flame and owe their activity to physical structure and/or chemical constituents which require that they be used under such conditions that these special characteristics will not be destroyed. Examples of oxidation catalyst which are particularly suited for use in the invention including activated forms of metal oxides impregnated with a minor amount of metal in finely divided form.

In particular, activated forms of alumina, beryllia, thoria, zirconia, or magnesia, or mixtures of these oxides, impregnated with minor amounts of finely divided metals such as platinum, palladium, rhodium, ruthenium, silver, copper, chromium, manganese, nickel, cobalt or combinations of these metals such as silver-chromium, copper chromium, copper-manganese combination, have been found to be especially suitable. Activated forms of these metal oxides may be prepared by controlled dehydration of hydrated form of the oxide of the metal with the activated form of metal oxide thus produced having an extremely high porosity which results in a very large area being impregnated with the finely divided metal.

The present invention is directed to a novel organization employing an oxidation catalyst immediately upstream of a bed of material which is required to be heated to a much higher temperature than the oxidation catalyst before a fuel-air mixture will be oxidized or burned within the bed of material. In accordance with the invention there is provided a housing within which is disposed a bed of discrete material. This bed of material is supported upon a plurality of horizontally disposed elongated members extending across the housing and disposed in generally parallel spaced relation such that the material cannot pass downward past these members but fluidizing gas may pass upward therethrough. These members are coated or impregnated with an active oxidation catalyst such that the activation temperature of the catalyst is substantially below the minimum bed temperature which is required to oxidize a fuel-air mixture. Means are provided to force air upwardly through the housing over the elongated members and through the bed of material to fluidize this material with an air heater being employed to heat the air sufficiently to raise the temperature of the catalyst to its activation temperature. Below the elongated members are a plurality of fuel distribution conduits and immediately above these members and in the lower portion of the bed there is another group of fuel distribution conduits. In operation, the fuel distribution conduits below the elongated members are first used to inject fuel into the housing and this fuel mixes with the air and is oxidized by the catalyst with the heat thus developed heating the bed of material or a portion of the bed to its required minimum temperature. Thereafter fuel is introduced into the fuel distribution conduits immediately above the elongated members and the supply of fuel below these members is terminated. In lieu of providing separate fuel distribution conduits below the elongated members which support the bed these members may be hollow with downwardly facing openings provided therein so that the members themselves form distribution conduits to which fuel may be supplied.

It is an object of this invention to provided an improved vapor generator or heater employing a fluidized bed of discrete material within which a fuel-air mixture is introduced and oxidized.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 2:
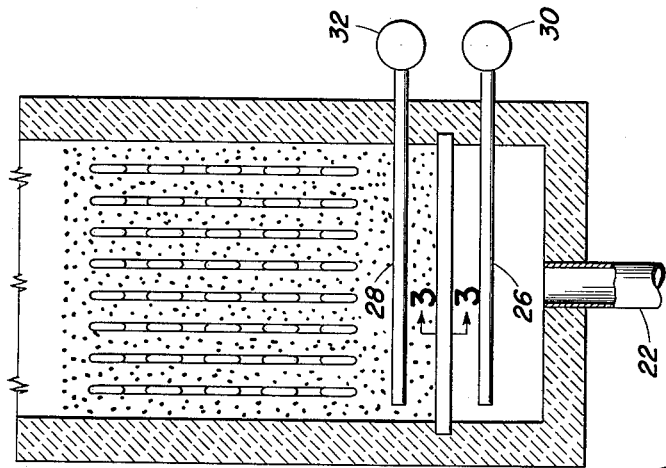
FIG. 2 is a section taken along 2—2 of FIG. 1.

Referring now to the drawing, wherein like reference characters are used throughout to designate like elements, the vapor generator or fluid heater shown therein comprises housing 10 within which is disposed a bed of material 12 which is in discrete or particulate form so that it may be fluidized by passing a gas upwardly therethrough within a predetermined range of velocities. This bed of material is supported in spaced relation with the bottom of the housing and upon the support designated generally 14. This support is made up of a plurality of elongated bars, rods or tubes 16, which extend across the housing and are supported by the housing in any suitable manner. These elongated members are positioned in parallel, closely spaced relation so as to provide openings 18 between adjacent members which permit the flow of a fluidizing gas preferably air, upwardly through the support and into the bed but prevent the passage of the particulate material of the bed downward through the support.

Combustion supporting air is supplied to the lower end of housing 10 by blower 20 through duct 22 and this air is heated as desired by any suitable air heater diagrammatically represented as 24.

Fuel may be introduced into the housing 10 either below or above support 14 with the fuel being supplied below the support by the distribution conduits 26 and above the support by the distribution conduits 28 with these conduits extending across housing 19 and being connected to the supply headers 30 and 32, respectively.

Positioned within bed 12 is the heat exchange coil 34 through which a fluid to be heated is conveyed and with this coil function as a vapor generator for the generation of steam or other vapor or as a heater for any desired fluid.

The elongated members 16 are coated or impregnated with an oxidation catalyst and the material in bed 12 must be heated to a temperature well above the activation temperature of this catalyst before a fuel-air mixture introduced into this bed will be oxidized upon passing through the bed.

In initiating operation of the vapor generator or fluid heater of this invention blower 20 and air heater 24 are activated so that hot air is forced upwardly through housing 10 passing over the elongated members of support 14 and upwardly through bed 12 with this air being heated sufficiently to heat the members 16 to the activation temperature of the catalyst. Thereafter fuel is introduced below support 14 through distribution conduits 26 and this fuel, being mixed with the air, is oxidized by the oxidation catalyst provided on the members of the support. The heat generated through the oxidation of this fuel heats the material of the bed or at least a portion or zone of it to the minimum temperature required for the oxidation of a fuel-air mixture introduced into the bed. Thereafter fuel is introduced into the lower portion of the bed through the distribution conduits 28 and the supply of fuel to the distribution conduits 26 is terminated with the fuel introduced through conduits 28 in the bed 12 being sufficient and regulated so as to maintain this bed above its minimum required operating temperature and with the air passing upwardly through the bed being regulated so as to maintain the bed in a fluidized condition resulting in extremely high rates of heat transfer to the fluid flowing through the coil 34. The air flowing past members 16 will keep them sufficiently cool to prevent the catalyst reaching its deactivation temperature.

Figure 1:
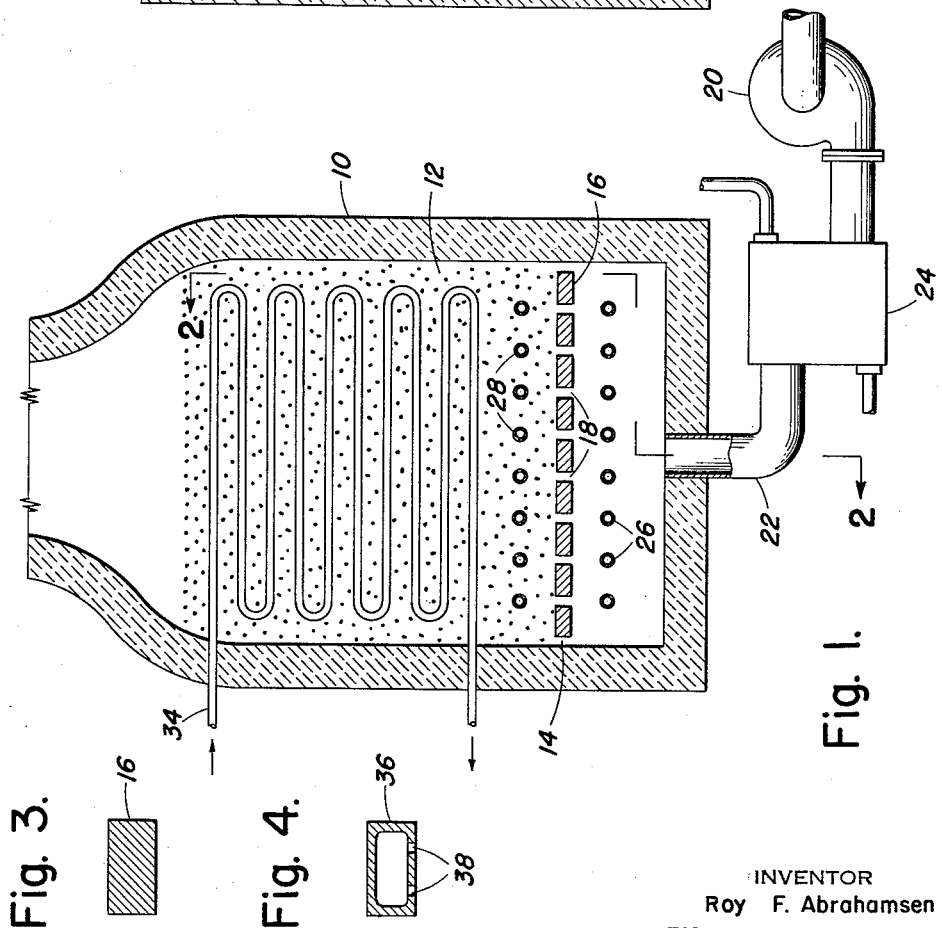
FIG. 1 is a diagrammatic representation in the form of a vertical section of a vapor generator or fluid heater embodying the present invention.
Figure 3:
FIG. 3 is a detailed transverse section of one of the elongated members making up the support for the bed of material.
Figure 4:
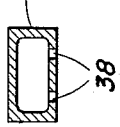
FIG. 4 is a view similar to FIG. 3 but showing a modified construction of these elongated members.

In lieu of providing separate fuel distribution conduits such as 26 below the support 14 the elongated elements 16 of the support may be hollow as shown in FIG. 4 and identified as 36, with openings 38 being provided in the bottom or lower portion of these elongated elements 36 and distributed throughout the length thereof so that fuel may be introduced into these members and distributed throughout the area of the support and below the support with the fuel-air mixture thus produced passing over the elements which make up this support. These hollow elements could be controllably supplied with fuel from a header such as 30 in the embodiment of FIGS. 1–3.

In starting it is unnecessary to heat the entire bed of material 12 to a sufficiently high temperature for it to oxidize a fuel-air mixture therewithin, but it will suffice to heat only a portion of this bed to such a high temperature since this zone will spread by itself upon introduction and oxidation of fuel within the bed.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. In a vapor generator the combination for an upright housing, a bed of discrete material disposed within said housing, a generally horizontally disposed support for said bed of discrete material extending across said housing and including elongated members in parallel spaced relation with the spacing of adjacent members being sufficiently close as to prevent the passage of the discrete material therebetween while permitting the passage of air upwardly therethrough into the bed, the outer surface of said members being comprised of a material that is an active oxidation catalyst having an activation temperature well below the minimum bed temperature that is required to oxidize a fuel-air mixture, means for heating the catalyst to its activation temperature, means for forcing air upwardly through the housing support and the bed of material at a rate to fluidize the material, means for introducing a fuel into the housing in a manner to contact the outer surface of the support members, means for introducing a fuel into the housing above the support, and a heat exchanger through which a fluid may be conveyed disposed in said bed.

2. The organization of claim 1 wherein the support members are solid.

3. The organization of claim 1 wherein the support members are hollow and are provided with downwardly facing openings and wherein the means for introducing fuel into the housing in a manner to contact the outer surface of the support members includes means to introduce fuel into these members for projection from these openings.

4. In a vapor generator comprising an upright housing containing a bed of discrete material capable of completely oxidizing a fuel-air mixture when the material is above a predetermined temperature, a grid at the lower portion of said bed and comprised of hollow elongated members positioned in parallel, spaced relation across the area of the housing, said members having downwardly facing openings distributed along their length and the outer surface of said members being comprised of an active oxidation catalyst having an activation temperature well below the minimum bed temperature that is required to oxidize a fuel-air mixture, means for forcing air upwardly through said bed of material and grid at a sufficient velocity to fluidize said bed of material, means for heating said air and in turn said grid to raise the temperature of the grid above the activation temperature of the catalyst, means for introducing fuel into said elongated members for distribution through said downwardly facing openings for oxidation on the surface of said members, means for introducing fuel into the bed at a location above said grid, and steam generating tubes disposed within said bed of material.

References Cited in the file of this patent

UNITED STATES PATENTS

| | | |
|---|---|---|
| 2,404,574 | Hammond | July 23, 1946 |
| 2,729,428 | Milmore | Jan. 3, 1956 |
| 2,876,079 | Upchurch | Mar. 3, 1959 |
| 2,905,523 | Houdry et al. | Sept. 22, 1959 |